United States Patent
Le

(10) Patent No.: US 9,620,759 B2
(45) Date of Patent: Apr. 11, 2017

(54) BATTERY SEPARATOR AND ITS CONSTRUCTING METHOD, AND LITHIUM-ION BATTERY

(71) Applicant: Huawei Technologies Co., Ltd., Shenzhen (CN)

(72) Inventor: Bin Le, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 14/144,788

(22) Filed: Dec. 31, 2013

(65) Prior Publication Data

US 2014/0113174 A1 Apr. 24, 2014

Related U.S. Application Data

(63) Continuation of application No. PCT/CN2012/072801, filed on Mar. 22, 2012.

(30) Foreign Application Priority Data

Aug. 1, 2011 (CN) .......................... 2011 1 0217966

(51) Int. Cl.
*H01M 10/0525* (2010.01)
*H01M 2/16* (2006.01)
*H01M 2/14* (2006.01)

(52) U.S. Cl.
CPC ......... *H01M 2/1686* (2013.01); *H01M 2/145* (2013.01); *H01M 2/166* (2013.01);
(Continued)

(58) Field of Classification Search
CPC .. H01M 2/1686; H01M 2/145; H01M 2/1653; H01M 2/166; H01M 10/0525
See application file for complete search history.

(56) References Cited

U.S. PATENT DOCUMENTS 3,951,687 A 4/1976 Takamura et al.
5,964,902 A * 10/1999 Mao ........................ H01M 4/62
29/623.1

(Continued)

FOREIGN PATENT DOCUMENTS

CN 1457517 11/2003
CN 1679183 10/2005
(Continued)

OTHER PUBLICATIONS

Extended European Search Report dated Mar. 18, 2014 in corresponding European Patent Application No. 12741480.3.
(Continued)

*Primary Examiner* — Ula C Ruddock
*Assistant Examiner* — Thomas Parsons
(74) *Attorney, Agent, or Firm* — Staas & Halsey LLP

(57) ABSTRACT

A battery separator includes: a basement layer that comprises polyolefin and/or nonwoven fabric; a composite layer that is disposed on at least one surface of the basement layer, where the composite layer comprises polymer adhesive, and boride powder and ceramic powder that are dispersed in the polymer adhesive. An embodiment of the present invention also provides a method for constructing a battery separator and a lithium-ion battery. In the battery separator provided by the embodiment of the present invention, by adding the boride powder, the battery separator may prevent electrolyte deterioration, thereby improving the battery cycle performance; by adding the ceramic powder, reliability may be enhanced for heat resistance of the battery separator and security of the battery.

11 Claims, 2 Drawing Sheets

(52) U.S. Cl.
CPC ..... *H01M 2/1653* (2013.01); *H01M 10/0525* (2013.01); *Y02E 60/122* (2013.01)

(56) References Cited

U.S. PATENT DOCUMENTS

| | | | |
|---|---|---|---|
| 2003/0104273 A1 | 6/2003 | Lee et al. | |
| 2006/0024569 A1 | 2/2006 | Hennige et al. | |
| 2006/0281006 A1 | 12/2006 | Fujino et al. | |
| 2009/0111025 A1 | 4/2009 | Lee et al. | |
| 2009/0111026 A1 | 4/2009 | Kim et al. | |
| 2010/0028768 A1 | 2/2010 | Morita et al. | |
| 2011/0027658 A1* | 2/2011 | Kim .................. | H01M 2/1646 429/247 |
| 2012/0308872 A1* | 12/2012 | Huang ................ | H01M 2/145 429/149 |

FOREIGN PATENT DOCUMENTS

| | | |
|---|---|---|
| CN | 1691367 | 11/2005 |
| CN | 1816923 | 8/2006 |
| CN | 101088183 | 12/2007 |
| CN | 101369645 | 2/2009 |
| CN | 101542777 | 9/2009 |
| CN | 101707242 | 5/2010 |
| CN | 101989651 | 3/2011 |
| CN | 102299286 | 12/2011 |
| DE | 102009055944 | 6/2011 |
| FR | 2251922 | 6/1975 |
| JP | 2005-196999 | 7/2005 |
| JP | 2005196999 * | 7/2005 |
| WO | 2010/124892 | 11/2010 |

OTHER PUBLICATIONS

International Search Report mailed Jun. 14, 2012 in corresponding International Application No. PCT/CN2012?072801.

Chinese Office Action mailed Mar. 11, 2013 in corresponding Chinese Application No. 201110217966.7.

* cited by examiner

BATTERY SEPARATOR AND ITS CONSTRUCTING METHOD, AND LITHIUM-ION BATTERY

CROSS-REFERENCE TO RELATED APPLICATIONS

This application is a continuation of International Application No. PCT/CN2012/072801, filed on Mar. 22, 2012, which claims priority to Chinese Patent Application No. 201110217966.7, filed on Aug. 1, 2011, both of which are hereby incorporated by reference in their entireties.

TECHNICAL FIELD

Embodiments of the present invention relate to the field of battery technologies, and in particular, to a battery separator and its constructing method, and a lithium-ion battery.

BACKGROUND

A battery separator is a membrane between a positive electrode and a negative electrode of a battery and is a critical component in a battery. The main functions are to separate a positive electrode and a negative electrode of the battery from each other to disable free electronic transport within the battery, but to enable free ionic transport of electrolyte between the electrodes. Performance of a battery separator determines the battery interface structure and the battery internal resistance, and further affects the battery performance, such as capacity, cycle performance, and current density during charging and discharging.

A battery separator is usually made from polypropylene and polyethylene. However, the battery separator made from polypropylene and polyethylene has a drawback in affinity for electrolyte, such as low electrolyte absorption, low surface energy and high heat shrinkage rate. The battery separator shrinks greatly when heated over 100° C. which results in a short circuit between the battery electrodes.

In the prior art, a separator substrate made from polypropylene and polyethylene may be coated on the surface with inorganic particles, such as silica and calcium carbonate, thereby lessening heat shrinkage of the battery separator to a certain degree. However, improvement on the battery performance after adopting this method is limited, moreover, the battery cycle and security performance are difficult to be improved.

SUMMARY

Embodiments of the present invention provide a battery separator and its constructing method, and a lithium-ion battery, so as to improve cycle performance and security performance of a battery.

A battery separator includes:
a basement layer that comprises polyolefin and/or nonwoven fabric; and
a composite layer disposed on at least one surface of the basement layer, where the composite layer comprises polymer adhesive, and boride powder and ceramic powder that are dispersed in the polymer adhesive.

A method for constructing a battery separator includes:
adding boride powder and ceramic powder in a polymer adhesive solution to obtain hybrid slurry; and
coating at least one surface of a basement layer that comprises polyolefin and/or nonwoven fabric with the hybrid slurry, so as to obtain a battery separator after the hybrid slurry is dried.

A lithium-ion battery includes:
a positive electrode, a negative electrode, a battery separator, electrolyte and a battery case; where:
the battery separator is the battery separator according to any one of claims 1 to 3.

In the battery separator provided by the embodiment of the present invention, by adding the boride powder, the battery separator may prevent electrolyte deterioration, thereby improving the battery cycle performance; by adding the ceramic powder, reliability may be enhanced for heat resistance of the battery separator and security of the battery.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from the accompanying drawings without creative efforts.

DESCRIPTION OF EMBODIMENTS

An embodiment of the present invention provides a battery separator. By adding boride powder, the battery separator may prevent electrolyte deterioration, thereby improving the battery cycle performance; by adding ceramic powder, reliability may be enhanced for heat resistance of the battery separator and security of the battery. An embodiment of the present invention also provides a method for constructing the battery separator and a lithium-ion battery. The following provides a detailed description for each embodiment.

Figure 1:
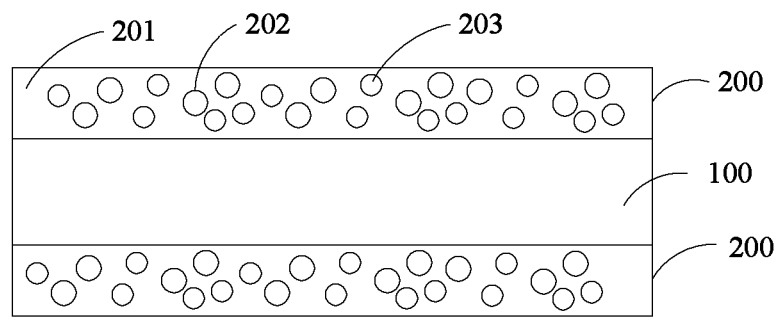
FIG. 1 is a structural schematic diagram of a battery separator according to an embodiment of the present invention.

Referring to FIG. 1, this embodiment provides a battery separator, including:
a basement layer 100 that comprises polyolefin and/or nonwoven fabric; and
a composite layer 200 disposed on at least one surface of the basement layer, where the composite layer comprises polymer adhesive 201, and boride powder 202 and ceramic powder 203 that are dispersed in the polymer adhesive.

In the composite layer, a weight rate of the boride powder in the composite layer is between 1% and 10%, that of the ceramic between 80% and 98%, and that of the polymer adhesive between 1% and 10%.

The basement layer may be polyolefin porous membrane or nonwoven fabric, or a combination of the two. The polyolefin porous membrane may be monolayer membrane or multilayer membrane.

The polymer adhesive may be vinyl polymer or vinyl copolymer, or a combination of the two. For example, the polymer adhesive may be one or multiple ones selected from a group of: poly (vinylidene difluoride), polyacrylonitrile, polyethylene oxide, poly-propylene oxide, polymethyl methacrylate, polyvinyl acetate, and poly (vinyldiene fluoride-co-hexafluoropropylene).

The boride powder is a binary compound between boron and metal or nonmetal (like carbon), and may be expressed by a general formula MmBn. For example, the boride powder may be one or multiple ones selected from a group of: boron oxide, calcium hexaboride, titanium diboride, chromium diboride, and aluminum diboride. In this embodiment, the boride powder disperses in the polymer adhesive in a form of powder with a size of 0.001-25 μm.

The ceramic designates ceramic fiber in a form of powder with a size of 0.001-25 μm. For example, the ceramic may be one or multiple ones selected from a group of: silicon nitride, zirconium diboride, aluminum silicate, and boron carbide.

The composite layer may be adhered to one or two surfaces of the basement layer by means, such as by printing, or spraying, or coating, or soaking. Generally, the polymer adhesive may be added into a certain solvent like N-Methyl-2-pyrrolidone or acetone for stirring until the polymer is uniformly dispersed, and a polymer solution is done. Then, the boride powder and the ceramic powder are added into the polymer solution for stirring until the powders are uniformly dispersed. After that, the polymer solution is adhered to the basement layer by using the foregoing method. A battery separator is done after the polymer solution is dried and solidified.

In an implementation manner, the polymer adhesive preferentially adopts polymethyl methacrylate and polyacrylonitrile. Reacting actively with oxygen in a nonaqueous solvent of carbonate ester class in electrolyte, carboxyl in polymethyl methacrylate has a stronger ability of electrolyte absorption accordingly; at the meantime, lithium in the battery may perform coordination with cyano group which has polarity in polyacrylonitrile to produce coordination complex, thereby improving peristalsis ability of the polymer chain and electricity conductivity.

In the battery separator provided by the embodiment of the present invention, the additive boride powder has high water absorption. This may decrease an acidic material generated by water in the battery electrolyte, so as to prevent the electrolyte deterioration, thereby improving the battery cycle performance and expanding the battery lifespan. The additive ceramic powder has a good stability. This may enhance thermal stability of the battery separator, so as to improve heat resistance of the battery separator, thereby improving the battery security.

Figure 2:
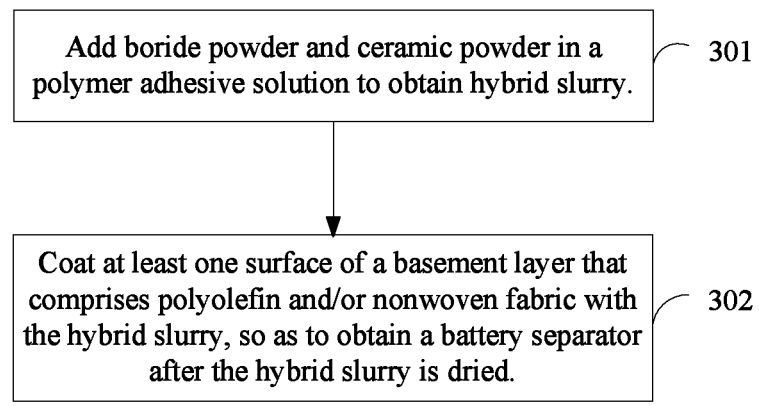
FIG. 2 is a flow chart of a method for constructing a battery separator according to an embodiment of the present invention.

Referring to FIG. 2, an embodiment of the present invention also provides a method for constructing a battery separator, including:

Step 301: Add boride powder and ceramic powder in a polymer adhesive solution to obtain hybrid slurry.

The polymer adhesive solution refers to liquid polymer adhesive. The polymer adhesive may be added to a certain solvent like N-Methyl-2-pyrrolidone or acetone to obtain a polymer adhesive solution. After the polymer adhesive is added into the solvent, the solvent is stirred until the polymer adhesive is dissolved; after adding the boride powder and the ceramic powder into the polymer solution, stir the solution until the powders are uniformly dispersed.

Step 302: Coat at least one surface of a basement layer that comprises polyolefin and/or nonwoven fabric with the hybrid slurry, so as to obtain a battery separator after the hybrid slurry is dried.

Specifically, the hybrid slurry may be sprayed or coated on one or two surfaces of the basement layer; in addition, the hybrid slurry may be adhered to one or two surfaces of the basement layer by soaking the basement layer in the hybrid slurry. After being dried, the hybrid slurry adheres to at least one surface of the basement and forms a composite layer. Then, the battery separator is done.

It should be noted that the solvent is not indispensable. The solvent is used as an auxiliary material to streamline processing. The goal of the preset invention may also be realized by uniformly stirring the polymer adhesive, the boride powder and the ceramic powder until they adhere to the basement layer.

In the battery separator provided by the embodiment of the present invention, the additive boride powder has high water absorption. This may decrease an acidic material generated by water in the battery electrolyte, so as to prevent the electrolyte deterioration, thereby improving the battery cycle performance and expanding the battery lifespan. The additive ceramic powder has a good stability. This may enhance thermal stability of the battery separator, so as to improve heat resistance of the battery separator, thereby improving the battery security.

An embodiment of the present invention also provides a lithium-ion battery, including a positive electrode, a negative electrode, a battery separator, electrolyte and a battery case; the separator is the one described in the previous embodiment.

The positive electrode may be made from lithium iron phosphate that contains cathode active material, and the negative electrode may be made from carbon that contains anode active material. The battery separator is placed between adjacent positive and negative pole pieces. By using winding or layering technique, these three elements may form a cathode mix that is molded together with the electrolyte into the battery case to form a battery.

It should be noted that, in the lithium-ion battery provided by embodiments of the present invention, the cathode active material may be one or any combination of the following substances: graphite, hard carbon, soft carbon, lithium titanate, silicon hybrid carbon, and tin; cathode active material may also be one or any combination of the following substances: lithium cobalt oxide, lithium nickel oxide, lithium nickel manganese cobalt oxide, lithium nickel cobalt aluminum oxide, lithium manganese oxide, lithium iron phosphate, lithium manganese phosphate, and lithium vanadium phosphate; the lithium in the electrolyte may be one or multiple ones selected from a group of: lithium hexafluorophosphate, lithium tetrafluoroborate, lithium bisoxalatoborate, lithium oxalyldifluoroborate, and lithium bis(trifluoromethanesulfonyl)imide; a nonaqueous solvent in the electrolyte may be one or any combination of the following substances: ethylene carbonate, propylene carbonate, butylene carbonate, dimethyl carbonate, diethyl carbonate, methyl ethyl carbonate, methyl propyl carbonate, butyrolactonec, ethyl acetate, propyl acetate, butyl acetate, methyl propionate, and propyl propionate; additive in the electrolyte may be one or any combination of the following substances: solid electrolyte interface (SEI) film additive, overcharge-proof additive, electrolyte stabilizer, and additive for improving the electrical conductivity.

In the battery provided by the embodiment of the present invention, the additive boride powder in the battery separator has high water absorption. This may decrease an acidic material generated by water in the electrolyte, so as to prevent the electrolyte deterioration, thereby improving the battery cycle performance and expanding the battery lifespan; the additive ceramic powder in the battery separator has a good stability. This may enhance thermal stability of the battery separator, so as to improve heat resistance of the battery separator, thereby improving the battery security.

The following provides some application examples and one comparative example:

APPLICATION EXAMPLE 1

Polyvinylidene fluoride (PVDF) is used as polymer adhesive; N-Methyl-2-pyrrolidone (NMP) is used as a solvent; boron oxide powder is used as boride powder; aluminum silicate powder is used as ceramic powder. The process for constructing a battery separator is as follows:

adding 30 g of polyvinylidene fluoride into a proper quantity of an NMP solvent, and stiffing the polyvinylidene fluoride until dissolved so as to obtain a uniform polymer solution; adding 950 g of aluminum silicate ceramic powder first and then 20 g of boron oxide powder into the polymer solution, and stirring the solution at a high speed to obtain uniformly dispersed hybrid slurry; printing the hybrid slurry on a basement layer of polyolefin porous membrane by using an intaglio printing technique so as to obtain a battery separator after the hybrid slurry is dried.

APPLICATION EXAMPLE 2

Polyvinylidene fluoride is still used as polymer adhesive; N-Methyl-2-pyrrolidone is still used as a solvent; aluminum diboride powder is used as boride powder; silicon nitride powder is used as ceramic powder, and the process for constructing a battery separator is as follows:

adding 25 g of polyvinylidene fluoride into a proper quantity of an NMP solvent, and stiffing the polyvinylidene fluoride until dissolved so as to obtain a uniform polymer solution; adding 950 g of silicon nitride powder first and then 25 g of boron carbide powder into the polymer solution, and stirring the solution at a high speed to obtain uniformly dispersed hybrid slurry; printing the hybrid slurry on a basement layer of polyolefin porous membrane by using an intaglio printing technique so as to obtain a battery separator after the hybrid slurry is dried.

APPLICATION EXAMPLE 3

Poly(vinylidenefluoride-hexaflouropropylene) (PVDF-HFP) is used as polymer adhesive; N-Methyl-2-pyrrolidone is still used as a solvent; aluminum diboride powder is used as boride powder; aluminum silicate powder is used as ceramic powder uses, and the process for constructing a battery separator is as follows:

adding 30 g of poly(vinylidenefluoride-hexaflouropropylene) into a proper quantity of an NMP solvent, and stirring the poly(vinylidenefluoride-hexaflouropropylene) until dissolved so as to obtain a uniform polymer solution; adding 950 g of aluminum silicate ceramic powder first and then 20 g of aluminum diboride powder into the polymer solution, and stirring the solution at a high speed to obtain uniformly dispersed hybrid slurry; printing the hybrid slurry on a basement layer of polyolefin porous membrane by using an intaglio printing technique so as to obtain a battery separator after the hybrid slurry is dried.

APPLICATION EXAMPLE 4

Polyvinylidene fluoride is used as polymer adhesive; acetone is used as a solvent; boron oxide powder is used as boride powder; aluminum silicate powder is used as ceramic powder, and the process for constructing a battery separator is as follows:

adding 40 g of polyvinylidene fluoride into acetone, and stirring the polyvinylidene fluoride until dissolved so as to obtain a uniform polymer solution; adding 940 g of aluminum silicate ceramic powder first and then 20 g boron oxide powder into the polymer solution, and stirring the solution at a high speed to obtain uniformly dispersed hybrid slurry; coating the hybrid slurry on a basement layer of nonwoven fabric porous membrane by using a coating technique so as to obtain a battery separator after the hybrid slurry is dried.

Comparative Example

This example is compared with a battery separator in the prior art made from polyethylene and without coating by boride powder and ceramic powder.

The following proves superior performance of the battery separator provided by the embodiment of the present invention through experimental statistics.

Experiment 1: testing the electrolyte absorption rate of battery separators made in the Application Example 1 to Application 4 and in the comparative example 1.

In a glove box protected by nitrogen, cut a battery separator into a required shape and weigh it, then soak the new battery separator in electrolyte of 1 mol/L LiPF6/EC-DEC (a volume ratio is 1:1) thoroughly. After that, use a filter paper to absorb redundant electrolyte on surfaces of the battery separator, and then weigh the battery separator. Divide the weight of the battery separator increased after the soaking by the weight before the soaking, and multiply by 100%, then the liquid absorption rate is figured out. Table 1 shows test results.

TABLE 1

|  | Mass before absorbing electrolyte/mg | Mass after absorbing electrolyte/mg | Electrolyte absorption rate/% |
|---|---|---|---|
| Application Example1 | 8.9 | 21.6 | 142.7% |
| Application Examplet 2 | 8.0 | 18.2 | 127.5% |
| Application Example 3 | 8.1 | 18.5 | 128.4% |
| Application Example 4 | 8.9 | 21.3 | 139.3% |
| Comparative Example 1: | 7.0 | 10.8 | 54.3% |

It can be seen from the test results shown in Table 1 that the electrolyte absorption of the battery separator provided by the embodiment of the present invention far exceeds that of the battery separator provided by the prior art.

Experiment 2: testing the stability of battery separators made in the Application Example 1 to Application 4 and in the comparative example 1.

Place the battery separators made in each of the four application examples and in this comparative example in an oven that is heated to 150° C. for an hour, and then take the battery separators out to calculate their heat shrinkage rate. The heat shrinkage may be calculated by a formula that the length of the battery separator before drying minus the length of the battery separator after drying and then divide by the length of the battery separator before drying. Table 2 shows test results.

TABLE 2

| | Heat shrinkage rate (%) (Being exposed in 150° C. for an hour) |
|---|---|
| Embodiment 1 | ~18 |
| Embodiment 2 | ~18 |
| Embodiment 3 | ~18 |
| Embodiment 4 | ~18 |
| Comparative Example 1: | ~70 |

It can be seen from the test results shown in Table 2 that the heat shrinkage rate of the battery separator provided by the embodiment of the present invention is far less than that of the battery separator provided by the prior art, thereby proving that a stability of the battery separator provided by the embodiment of the present invention is much better. This is because the battery separator provided by the embodiment of the present invention is added with ceramic powder that has strong resistance to a high temperature. Formed by chain entwining of the polymer adhesive, the three-dimensional network structure wraps the ceramic powder, thereby greatly improving thermal stability of the separator and further preventing a battery from a short circuit caused by being heated between the battery electrodes.

Experiment 3: testing the cycle performance of battery separators made in the Application Example 1 to Application Example 3 and in the comparative example 1.

Use the battery separators made in the Application Example 1 to Application Example 3 and in the comparative example 1 to fabricate a lithium-ion battery with a capacity of 1500 mAh. Test the battery cycle performance through charging and discharging with 1 C current, test results being shown in FIG. 3. Cycle performance may be proved by the number of times that the battery is charged and discharged.

Figure 3:
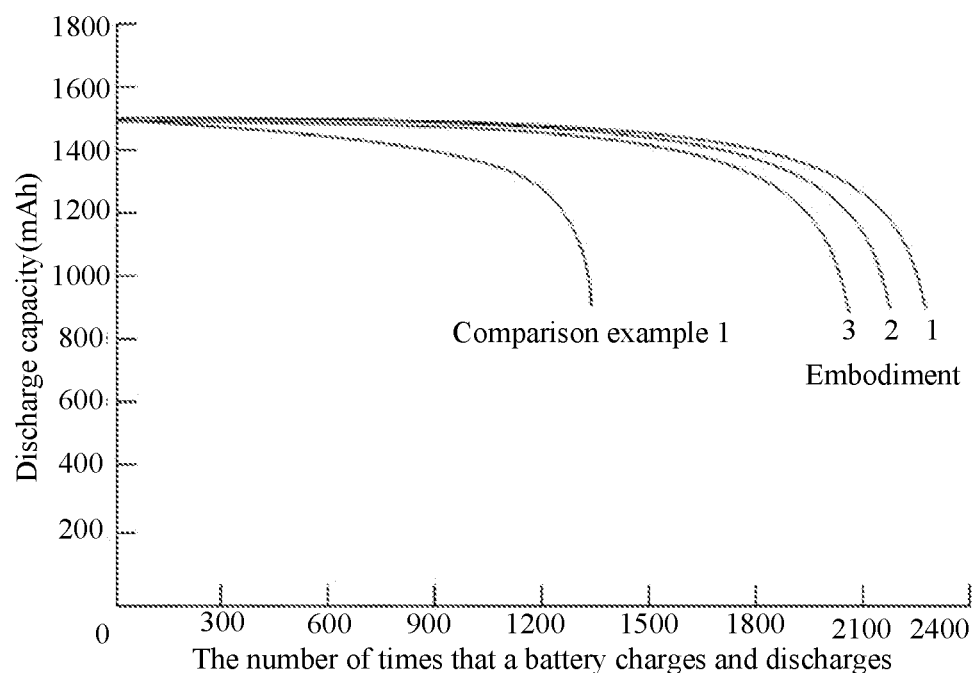
FIG. 3 is a schematic diagram of the number of times that a lithium-ion battery is charged and discharged according to an embodiment of the present invention.

It can be seen from FIG. 3 that the cycle performance of a battery using a batter separator provided by the embodiment of the present invention far outdoes that using a battery separator provided by the prior art. This is because the battery separator provided by the embodiment of the present invention is added with boride. The boride powder may suppress oxide generation by the reaction of electrolyte and water therein, particularly by hydrofluoric acid, and further improve the battery cycle performance and expand battery lifespan for charging and discharging.

The foregoing descriptions are merely exemplary specific embodiments of the present invention, but are not intended to limit the protection scope of the present invention. Any variation or replacement figured out by persons skilled in the art within the technical scope disclosed in the present invention shall fall within the protection scope of the present invention.

What is claimed is:

1. A battery separator, comprising:
   a basement layer that comprises polyolefin and/or nonwoven fabric;
   a composite layer disposed on at least one surface of the basement layer, wherein the composite layer comprises polymer adhesive, and boride powder and ceramic powder that are dispersed in the polymer adhesive.

2. The battery separator according to claim 1, wherein a weight rate that each element in the composite layer accounts for the composite layer is:
   the boride powder: approximately 1-10%; the ceramic powder: approximately 80-98%; the polymer adhesive: approximately 1-10%.

3. The battery separator according to claim 1, wherein:
   sizes of the boride powder and the ceramic powder are between approximately 0.001 micrometers and approximately 25 micrometers.

4. The battery separator according to claim 2, wherein:
   the boride powder comprises at least one selected from a group consisting of: calcium hexaboride, titanium diboride, chromium diboride, and aluminum diboride.

5. The battery separator according to claim 1, wherein:
   the ceramic comprises at least one selected from a group consisting of: aluminum silicate, silicon nitride, zirconium diboride, and boron carbide.

6. The battery separator according to claim 1, wherein:
   the polymer adhesive comprises vinyl polymer or vinyl copolymer, or a combination of the two.

7. The battery separator according to claim 6, wherein:
   the polymer adhesive comprises one or a combination of poly (vinylidene difluoride), polyacrylonitrile, polyethylene oxide, poly-propylene oxide, polymethyl methacrylate, polyvinyl acetate, and poly (vinyldiene fluoride-co-hexafluoropropylene).

8. A lithium-ion battery, comprising:
   a positive electrode, a negative electrode, a battery separator, a lithium electrolyte and a battery case;
   wherein the battery separator comprises:
   a basement layer that comprises polyolefin and/or nonwoven fabric; and
   a composite layer disposed on at least one surface of the basement layer, wherein the composite layer comprises polymer adhesive, and boride powder and ceramic powder that are dispersed in the polymer adhesive.

9. The lithium-ion battery according to claim 8, wherein a weight rate that each element in the composite layer accounts for the composite layer is:
   the boride powder: approximately 1-10%; the ceramic powder: approximately 80-98%; the polymer adhesive: approximately 1-10%.

10. The lithium-ion battery according to claim 8, wherein:
    sizes of the boride powder and the ceramic powder are between approximately 0.001 micrometers and approximately 25 micrometers.

11. The lithium-ion battery according to claim 9, wherein:
    the boride powder comprises at least one selected from a group consisting of: calcium hexaboride, titanium diboride, chromium diboride, and aluminum diboride.

* * * * *